(12) United States Patent (10) Patent No.: US 12,571,442 B2
Sosnowski et al. (45) Date of Patent: Mar. 10, 2026

(54) ROTOR CLIP FOR BRAKE ASSEMBLY

(71) Applicant: Goodrich Corporation, Charlotte, NC (US)

(72) Inventors: Mirosław Stanisław Sosnowski, Mirków (PL); Jacek Olejak, Bestwinka (PL); Aleksander Andrzej Błachut, Ozimek (PL)

(73) Assignee: GOODRICH CORPORATION, Charlotte, NC (US)

( * ) Notice: Subject to any disclaimer, the term of this patent is extended or adjusted under 35 U.S.C. 154(b) by 330 days.

(21) Appl. No.: 18/318,614

(22) Filed: May 16, 2023

(65) Prior Publication Data

US 2023/0400074 A1 Dec. 14, 2023

(30) Foreign Application Priority Data

Jun. 8, 2022 (EP) .................................... 22461564

(51) Int. Cl.
*F16D 65/12* (2006.01)
*F16D 65/02* (2006.01)
(52) U.S. Cl.
CPC ......... *F16D 65/123* (2013.01); *F16D 65/126* (2013.01); *F16D 2065/1308* (2013.01);
(Continued)
(58) Field of Classification Search
CPC .. F16D 65/123; F16D 65/126; F16D 65/0972; F16D 2065/1308;
(Continued)

(56) References Cited

U.S. PATENT DOCUMENTS

| | | | | | |
|---|---|---|---|---|---|
| 3,605,967 | A | * | 9/1971 | Warren | F16D 65/126 |
| | | | | | 188/218 XL |
| 3,972,395 | A | * | 8/1976 | Jannasch | F16D 65/126 |
| | | | | | 188/218 XL |

(Continued)

FOREIGN PATENT DOCUMENTS

| | | | |
|---|---|---|---|
| EP | 0161200 | 11/1985 | |
| EP | 3441638 | 2/2019 | |
| EP | 3901485 A1 * | 10/2021 | B64C 25/42 |

OTHER PUBLICATIONS

European Patent Office, European Search Report dated Oct. 31, 2022 in Application No. 22461564.1.

*Primary Examiner* — Thomas J Williams
(74) *Attorney, Agent, or Firm* — SNELL & WILMER L.L.P.

(57) ABSTRACT

A clip for a rotor disk of a brake assembly, the clip formed of sheet metal to fit in a slot between, and to, ends of adjacent rotor lugs around the periphery of the rotor disk, wherein the clip is shaped to have a main body portion that is substantially rectangular in form and shaped and sized to fit, in use, onto an inner peripheral surface defined by the slot between the ends of two adjacent lugs, and to extend across the length of the slot from a first main body portion edge to a second opposite main body portion edge; and wherein the clip further comprises first and second end portions that extend from the respective ends of the main body portion at an angle, wherein each end portion comprises an outwardly protruding section and an end clip portion.

13 Claims, 3 Drawing Sheets

(52) U.S. Cl.
CPC ................ *F16D 2065/1348* (2013.01); *F16D 2065/1372* (2013.01); *F16D 2065/1392* (2013.01)

(58) Field of Classification Search
CPC ..... F16D 2065/1348; F16D 2065/1372; F16D 2065/1392; F16D 2065/1368; F16D 55/36; F16D 2055/0058
See application file for complete search history.

(56) References Cited

U.S. PATENT DOCUMENTS

| | | | | |
|---|---|---|---|---|
| 4,249,642 | A * | 2/1981 | Anderson | F16D 65/126 188/218 XL |
| 4,557,356 | A * | 12/1985 | Petersen | F16D 65/126 188/218 XL |
| 4,863,001 | A * | 9/1989 | Edmisten | F16D 65/126 188/218 XL |
| 7,766,133 | B2 | 8/2010 | Cress | |
| 10,436,265 | B2 | 10/2019 | Stevenson | |
| 2019/0048949 | A1 * | 2/2019 | Stevenson | F16D 65/123 |
| 2021/0332865 | A1 | 10/2021 | Linder et al. | |
| 2023/0400074 | A1 * | 12/2023 | Sosnowski | F16D 65/123 |

* cited by examiner

Half cap clip

ROTOR CLIP FOR BRAKE ASSEMBLY

CROSS-REFERENCE TO RELATED APPLICATIONS

This application claims priority to, and the benefit of, EP Patent Application No. 22461564.1, filed Jun. 8, 2022 and titled "ROTOR CLIP FOR BRAKE ASSEMBLY," which is incorporated by reference herein in its entirety for all purposes.

FIELD

The present disclosure relates to a clip for the rotor of a brake assembly.

BACKGROUND

Braking assemblies for applying a braking force to a rotating body e.g. a wheel, are well known and typically comprise a brake stack of alternating rotor and stator disks. The braking assembly is actuated by applying a force to an actuator e.g. a piston which applies force to a pressure plate which compresses the rotor and stator disks of the brake stack together to cause deceleration and braking by friction. Typically, the rotor disks are provided with circumferential drive lugs via which the compressive force is applied to the rotor disks. Such braking mechanisms are well known and will not be described further in any detail. Brake assemblies operating in this way are common in aircraft and other vehicles. Where a high braking force is required, such as in aircraft, the rotor disks have to be made of a strong, heavy duty material such as a strong steel material or, more recently, carbon material. Carbon is preferred in many applications e.g. in aircraft, because it is more lightweight than steel for the same strength. Reduced weight of parts in or on aircraft allow for a reduction in fuel consumption and, in turn, reduced $CO_2$ emissions. Because of the material used, the rotor disks are expensive parts. In order to prolong the life of these disks, rotor clips are typically provided on the outer circumference of the disk e.g. on the drive lugs to provide some protection against wear of the rotor disk material. The clips transfer the drive force to the rotor drive lug. These clips, when they become worn, can be easily and relatively inexpensively replaced, allowing the more expensive rotor disks to be reused and extending their life.

Various designs for rotor clips are known, these include a spring clip secured over the rotor drive lug by means of a rivet or similar fastener. Half cap clips are also known, which fit over just the end part of the drive lug. Floating clips are also known, which are positioned between drive lugs and allow for some movement of the clip during braking. Again, these clips are secured in position by means of rivets or pins or similar fasteners. Usually, two rivets are passed through aligned holes in the clip and the lug and are secured by rivet heads.

As high torques are transferred by the clip, the fasteners securing the clips in place are also subject to high forces acting perpendicular to the force to be transmitted to the clip and these rivets/pins are subject to bending or breakage due to these forces. Furthermore, such fasteners will have a head that protrudes beyond the surface of the clip which can also be damaged or can cause damage to other parts. The force on the fasteners and the forces exerted by the fasteners in known designs might not be equally distributed and hot spots can be created where the fasteners exert forces on the clip or the rotor, e.g. at the back of the rivet heads, thus causing damage to the clip and/or rotor disk. Rivets that can provide the required strength and security are expensive and difficult to manufacture and use. The use of these rivets also introduces the risk of damage to the rotor disk material when the clips are being replaced. To assemble the clip, several steps are required—the clip has to be placed over the rotor lug and the holes in the clip aligned with the holes through the lug, then two separate pins or rivets need to be passed through the holes and secured with a further head or nut.

There is a need for an improved clip that avoids the need for rivets and avoids or mitigates these problems.

SUMMARY

According to the disclosure, there is provided a clip for a rotor disk of a brake assembly, the clip formed of sheet metal to fit in a slot between, and to, ends of adjacent rotor lugs around the periphery of the rotor disk, wherein the clip is shaped to have a main body portion that is substantially rectangular in form and shaped and sized to fit, in use, onto an inner peripheral surface defined by the slot between the ends of two adjacent lugs, and to extend across the length of the slot from a first main body portion edge to a second opposite main body portion edge; and wherein the clip further comprises first and second end portions that extend from the respective ends of the main body portion at an angle, wherein each end portion comprises an outwardly protruding section and an end clip portion. the outwardly protruding sections being shaped to fit into indentations or recesses between the lug ends and the inner peripheral surface; where the end clip portions each have a planar section that, in use, fit flat against respective ends of the lugs.

Also provided is a method for assembling such a clip, as well as a rotor disk, a brake assembly and a wheel assembly having such a clip design.

BRIEF DESCRIPTION OF THE DRAWINGS

Examples of the clip according to the disclosure will now be described with reference to the drawings. It should be noted that other examples are possible within the scope of the claims.

DETAILED DESCRIPTION

Figure 1:
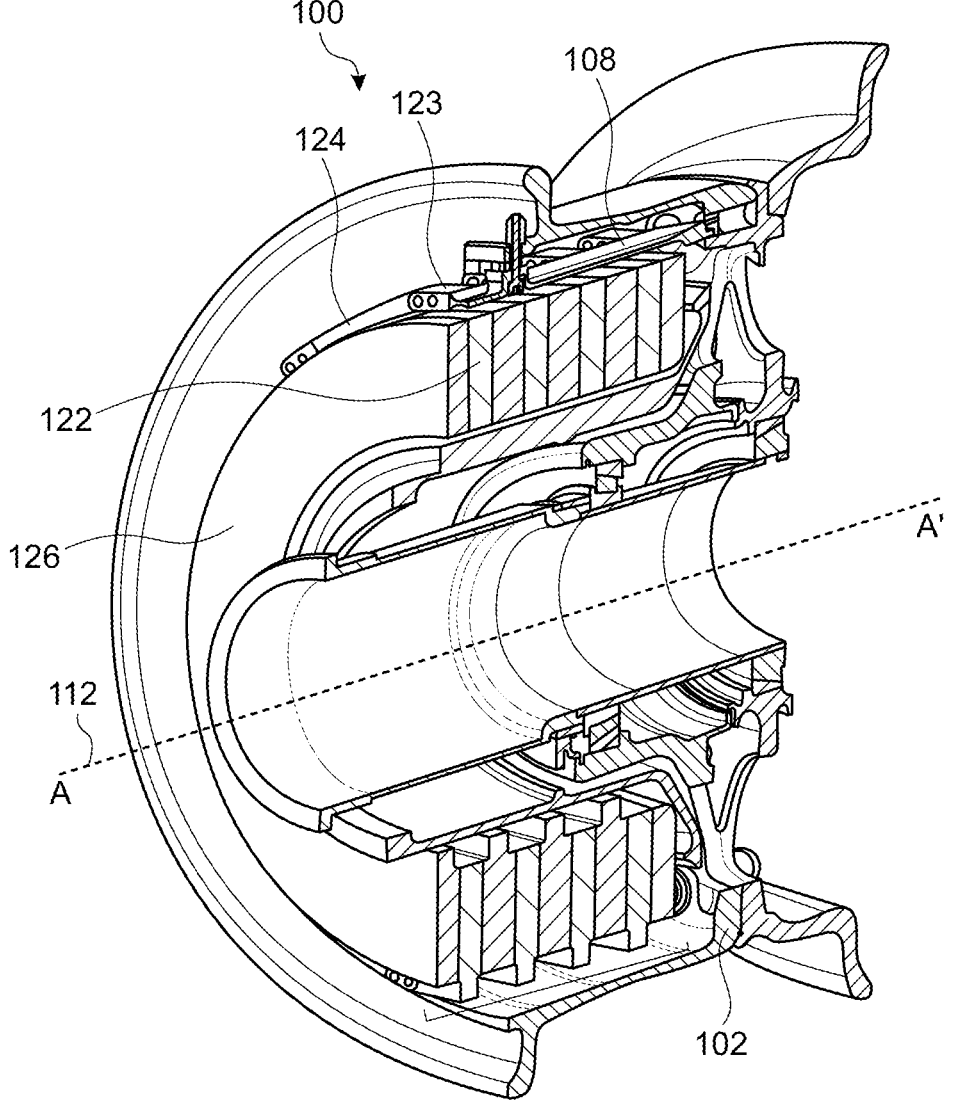
FIG. 1 is a perspective view of a section through a typical brake assembly.
Figure 2:
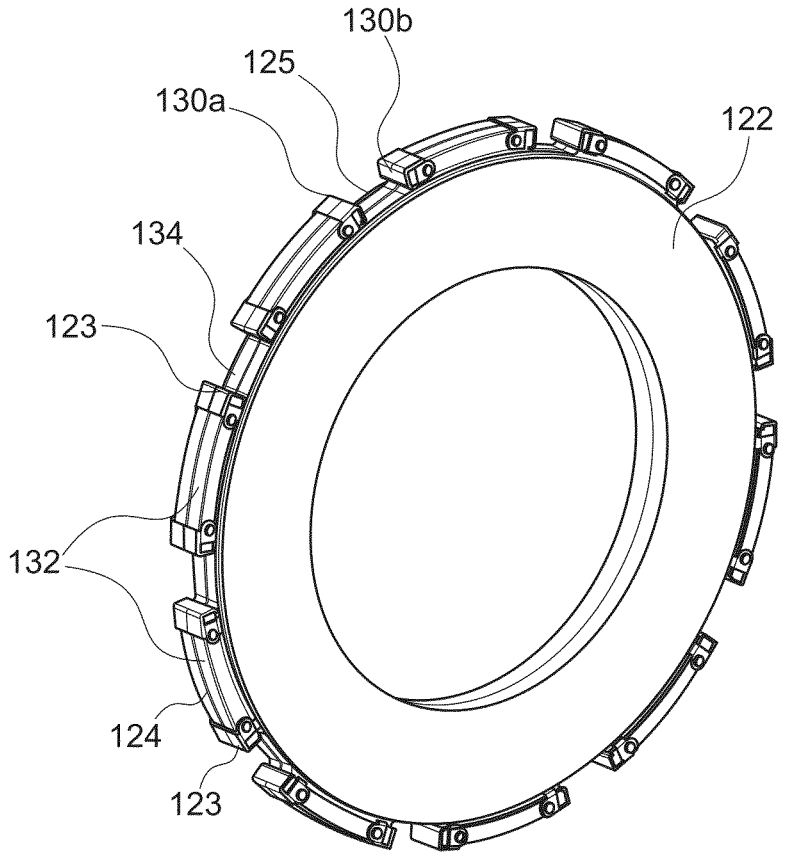
FIG. 2 is a simpler view of a rotor disk having lugs to which clips are attached.

Referring first to FIG. 1, a wheel brake assembly is shown for purposes of explanation. The brake assembly 100 is mounted within a wheel 102 which rotates about an axis A-A' 112. The brake assembly comprises a stack of alternate rotor disks 122 and stator disks 126 with the rotor disks rotatable with the wheel, and relative to the stator disks, about axis 112. To decelerate or brake rotation of the wheel pressure is applied by means of actuators in the axial direction A-A' to the brake stack to compress the rotor and stator disks together, causing friction between the rotor and stator disks and thus slowing the wheel. The rotor disks have rotor lugs 124 defined around their circumference and extending radially outwards with respect to the axis of rotation 112. Slots 125, shown in FIG. 2, are defined between adjacent lugs 124. Torque bars 108 act as drive lugs that engage the wheel with the rotor disks via the rotor lugs.

As mentioned above, in order to protect the rotor disk material against wear, the rotor lugs 124 may be provided with protective clips 123 via which the torque is transferred from the torque bars 108 to the rotor lugs 124, and hence to the rotor disk. During use, the operation of the brake assembly will cause the brake clips 123 to wear before the rotor disk material wears, and the clips 123 can be removed and new clips fitted, without needing to replace the entire rotor disk.

The provision of clips on the rotor lugs can also been seem in the simpler view of FIG. 2 which shows a rotor disk 122 having lugs 124 provided around its circumference, with clips 123 attached to the ends of the rotor lugs. The lugs and slots around the periphery of the stator disk are formed such that each lug has an outer peripheral surface 132 and two opposing ends 130*a*, 130*b* between which a peripheral slot 125 is formed, the slot defining an inner peripheral surface 134.

Conventionally, clips are attached to the rotor disks or rotor lugs by means of rivets that pass through the rotor lug from one side to the other. An example of such known clip designs is shown in FIG. 3.

Figure 3:
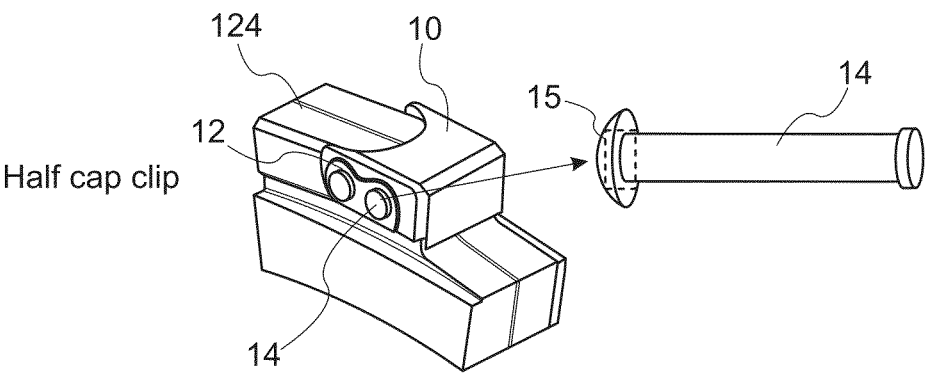
FIG. 3 shows a conventional clip with a rivet fastener.

FIG. 3 shows a so-called half cap clip 10 which has at least one rivet aperture 12 (in this example, there are two rivet apertures 12). The clip 10 is shaped to fit over the end of a rotor lug 124 and is secured to the lug by means of rivets 14 secured to the side of the lug through the clip apertures 12. As mentioned above, these rivets pass through the width of the rotor lug and can be subjected to bending forces. They can be expensive and difficult to manufacture and install and a hotspot of force can occur around the region of the rivet head 15.

Figure 4:
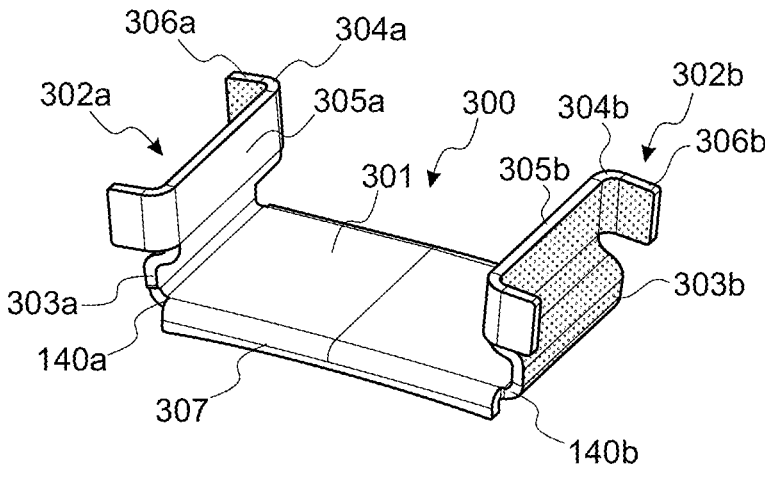
FIG. 4 shows a clip according to the disclosure.
Figure 5:
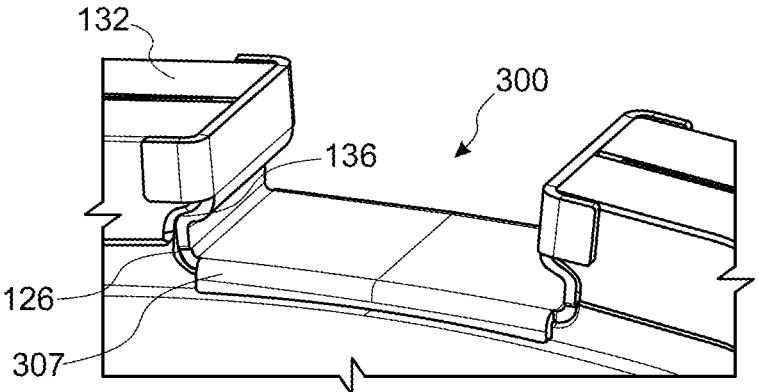
FIG. 5 shows a clip such as shown in FIG. 4 attached to a rotor lug.
Figure 6:
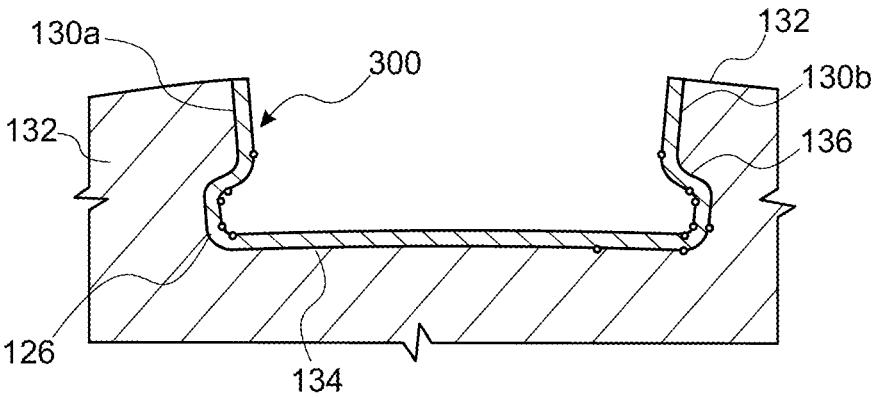
FIG. 6 is a cross-section through the assembly of FIG. 5.

The clip 300 according to the present disclosure, described below with reference to FIGS. 4 to 6, provides an alternative to the half-cap clip and two rivets for securing clip to the lug, which avoids the need for rivets or other fasteners, is simpler to manufacture and assemble and allows for improved stress distribution, less risk of damage to the carbon of the brake and no risk of bending of the fastener.

The clip 300 according to the disclosure is shaped, e.g. stamped and bent, from sheet metal to fit in the slot 125 between, and to, the ends of adjacent rotor lugs. To allow clips to be mounted to the ends 130*a*, 130*b* of the lugs, an indent or recess 126 is formed between the ends of the lug and the inner peripheral surface 134, so that the ends of the lug define an overhang 136 relative to the inner peripheral surface 134 defined by the slot.

The clip 300 is shaped to have a main body portion 301 that is essentially rectangular in form and shaped and sized to fit onto the inner peripheral surface defined by the slot 125 between the ends of two adjacent lugs, and extend across the length of the slot (defined as the direction from one end of the lug to the other) from a first edge 140*a* to a second opposite edge 140*b*. The width of the main body portion (in the direction perpendicular to the length direction) may be the same as or less than the width of the slot. The clip also has first and second end portions 302*a*, 302*b* that extend from the respective ends 140*a*, 140*b* of the main body portion at an angle. Each end portion comprises an outwardly protruding section 303*a*, 303*b* and an end clip portion 304*a*, 304*b*. The outwardly protruding sections are shaped to fit into the indentations or recesses 126 between the lug overhangs 136 and the inner peripheral surface 134.

The end clip portions each have a planar section 305*a*, 305*b* that, in use, fit flat against the respective ends 130*a*, 130*b* of the lugs and may further include opposing side arms 306*a*, 306*b* extending from the planar section to lie against the side of the end part of the lug. The main body portion 301 may also be provided with side portions 307 that, when the main body portion is located on the inner peripheral surface, extend over part of the rotor disk radially inwards of the inner peripheral surface. The side arms and the side portions are optional but, where present, may enhance the securing of the clip to the rotor disk.

The shape and size of the rotor indents and, correspondingly, of the protruding sections 303*a*, 303*b* of the clip can be varied according to design and user requirements. In the example shown, these are arcuate but other shapes are also possible.

The clip 300 is formed of a resilient sheet metal so that the clip can be located and secured by bending the end portions 302*a*, 302*b* slightly inwards, towards each other while the clip is located in the slot between the lugs and the main body portion 301 is placed over the inner peripheral surface. The end portions can then be released and they will return to their outward position such that the end clip portions engage with and lie flat against the lug ends with (where present) the side arms of the clip lying against the sides of the lug, and the protrusion engages in the indent/recess. In one method of assembly, the end clip portions may be mounted with the planar section and the side arms all in the same plane and, once the clip is in place, the side arms can then be bent around the sides of the lug. It is also feasible that the clip can be mounted to the rotor disk with the side arms already bent or partially bent.

In this way, the clip self-secures in the slot and over the ends of the lugs without the need for additional fasteners. The end clip portions lie directly on the end face of the rotor disk lug so that the clip forces are transferred directly to the carbon rotor disk.

To remove the clip, the end portions are moved inwards against the bias of the metal, i.e. moved towards each other and the clip can then be lifted out of the slot.

The clip has a relatively large contact area with the rotor disk as compared to other clips just fitted to the lug itself. The greater contact area allows for a greater load distribution across the clip and, therefore, less risk of damage to the carbon rotor disk.

The clip is therefore self-supporting, thus avoiding the need for rivets or the like, is small, light, simple and inexpensive to manufacture and assemble and allows for a better transfer of force through the clip and the lug.

What is claimed is:

1. A rivet-less clip for a rotor disk of a brake assembly, the rivet-less clip formed of sheet metal to fit in a slot between, and to, ends of adjacent rotor lugs around a periphery of the rotor disk, wherein the rivet-less clip is shaped to have a main body portion that is substantially rectangular in form and shaped and sized to fit, in use, onto an inner peripheral surface defined by the slot between ends of two adjacent rotor lugs, and to extend across a length of the slot from a first main body portion edge to a second opposite main body portion edge; wherein the rivet-less clip further comprises first and second end portions that extend from the respective ends of the main body portion at an angle, wherein each end portion of the first and second end portions comprises an outwardly protruding section and an end clip portion, the outwardly protruding sections being shaped to fit into indentations or recesses between lug ends and the inner peripheral surface; wherein the end clip portion of the first and second end portions each have a planar section that, in use, fit flat against respective ends of the adjacent rotor lugs, wherein the rivet-less clip is formed as two separate halves each having a portion of the main body portion and one of the first and second end portions, and wherein the portions of the main body portion of the two halves abut when the rivet-less clip is located in the slot together forming the main body portion, the rivet-less clip further comprising side portions extending along and bent down relative to the sides of the main body portion between the first and second main body portion edges, the side portions configured to, when the rivet-less clip is located in the slot on the inner peripheral surface, extend over part of the rotor disk radially inwards of the inner peripheral surface.

2. The rivet-less clip of claim 1, wherein the end clip portion of the first and second end portions further comprise opposing side arms extending from the planar section to lie against sides of a lug, in use.

3. The rivet-less clip of claim 1, wherein the sheet metal is resilient.

4. The rivet-less clip of claim 1, wherein the outwardly protruding sections are arcuate.

5. The rivet-less clip of claim 1, wherein the angle is such that the end portion of the first and second end portions taper outwards relative to the main body portion.

6. The rivet-less clip of claim 1, formed of a single piece.

7. A method of fitting the rivet-less clip as claimed in claim 1 to a rotor disk of the brake assembly, the method comprising fitting the rivet-less clip into the slot between the two adjacent rotor lugs such that the main body portion lies flat on the inner peripheral surface, the end clip portion of the first and second end portions lie flat against the ends of the adjacent rotor lugs, and the side portions lie along long sides of the slot and extend over part of the rotor disk radially inwards of the inner peripheral surface.

8. The method of claim 7, comprising inserting the rivet-less clip into the slot between the adjacent rotor lugs with the first and second end portions of the rivet-less clip bent inwards and releasing the first and second end portions to be biased into engagement with a lug after insertion.

9. A rotor disk of the brake assembly provided with a plurality of rotor lugs around and radially extending from its circumference; and the rivet-less clip as claimed in claim 1 mounted in the slot between pairs of the adjacent rotor lugs.

10. The brake assembly comprising a plurality of rotor disks as claimed in claim 9 and a plurality of stator disks, the plurality of stator disks and the plurality of rotor disks arranged alternately to form a brake stack.

11. A wheel assembly comprising a wheel having an inner diameter within which is mounted to the brake assembly as claimed in claim 10.

12. The wheel assembly as claimed in claim 11, the wheel having an outer diameter onto which a tire is mounted.

13. The wheel assembly as claimed in claim 11, being the wheel assembly for a landing gear of an aircraft.

\* \* \* \* \*